United States Patent [19]

Kaufman

[11] Patent Number: 4,527,813
[45] Date of Patent: Jul. 9, 1985

[54] HANDLE FOR A SHOPPING CART

[76] Inventor: Lazar Kaufman, 454 Fort Washington Ave., Apt. 50A, New York, N.Y. 10033

[21] Appl. No.: 433,851

[22] Filed: Dec. 27, 1982

[51] Int. Cl.³ .............................................. B62B 1/12
[52] U.S. Cl. ..................................... 280/654; 280/659; 280/47.26; 280/47.37 R
[58] Field of Search ............... 280/654, 655, 652, 659, 280/47.37 R, 645, 33.99 A, 651, 47.26, DIG. 3; D34/24

[56] References Cited

U.S. PATENT DOCUMENTS

| D. 250,011 | 10/1978 | Rink | D34/24 |
|---|---|---|---|
| 3,310,317 | 3/1967 | Luff | 280/652 |
| 3,697,095 | 10/1972 | Howell | 280/47.37 R |
| 4,059,285 | 11/1977 | McCoy | 280/654 |

Primary Examiner—David M. Mitchell

[57] ABSTRACT

A collapsible shopping cart where a specially made high rear traverse of the box, serves as a handle for the shopping cart. The legs of said handle are connected by means of rings with the usual traverse of the shopping cart and as a result, when the box is opened, said handle is placed above the traverse of the shopping cart, which increases its length and lightens the moving of the loaded shopping cart.

4 Claims, 6 Drawing Figures

HANDLE FOR A SHOPPING CART

SUMMARY OF THE INVENTION

Usually the collapsible shopping cart uses as a handle its traverse, the legs of which are diagonally placed across the side of the shopping cart box. This causes a decrease of the shopping cart length when it is collapsed. In this invention the back traverse of the box is used as a handle and it is placed above other of the box walls. The legs of this traverse are connected by means of rings with the traverse of the shopping cart and as a result, the length of the shopping cart is increased when the box is collapsed. The handle is placed above the traverse of the shopping cart and makes moving the loaded shopping cart easier.

DETAILED DESCRIPTION

The height of shopping cart handles of different models is planned for people of average height. For them, among others it is not comfortable to utilize this shopping cart, since in most cases, they to have to bend in order to give a bigger slope to the cart in order to minimize the effort required to move it. Besides this, the shopping cart hits the feet of the person when he pulls it and when he pushes it. This invention provides a convenient design of the shopping cart. The above mentioned shortcoming of the collapsible shopping carts is the result of using the traverse of the shopping cart as its handle because when the shopping cart is collapsed then the traverse is inclined and moves back and therefore it is so placed that the length of the shopping cart is decreased.

BRIEF DESCRIPTION OF THE DRAWINGS

FIG. 1 shows the shopping cart where legs 1 of its box 2 are connected with the traverse 3 of the shopping cart by means of rings 4, which envelop said traverse 3 with said legs 1. When the box is open the traverse 5 of the box, which is used as a handle of the shopping cart, is placed above the traverse 3 of the shopping cart and said legs 1 are curved towards the box. When the shopping cart is collapsed, the traverse 3 is inclined and removes from the traverse 5 of the box.

FIG. 2 shows a variation of the shopping cart which uses a supplementary handle, the legs 6 of which with slots on its ends are passed through two rings 4 and said slots envelop the traverse 7 of the box. The locking of the handle is made by means of pins 8, which are inserted in holes at the ends of said supplementary handle, or by means of plugs 9 which are provided with slots which coincide to the traverse 7 and in this way, said plugs lock the traverse 7 when it is placed in the slots 10 of the supplementary handle 6.

FIG. 5 shows a variation of the supplementary handle which is curved in such a manner that one its legs envelops the traverse from one side and the other of its legs envelops said traverse from the opposite side. This variation connects the supplementary handle with the traverse of the shopping cart without any rings. The length of the curved parts of the supplementary handle has to correspond to the distance of the leg's movement on the supplementary handle.

FIG. 6 shows the position of the shopping cart with the supplementary handle when it is moved with a load.

Figure 1:
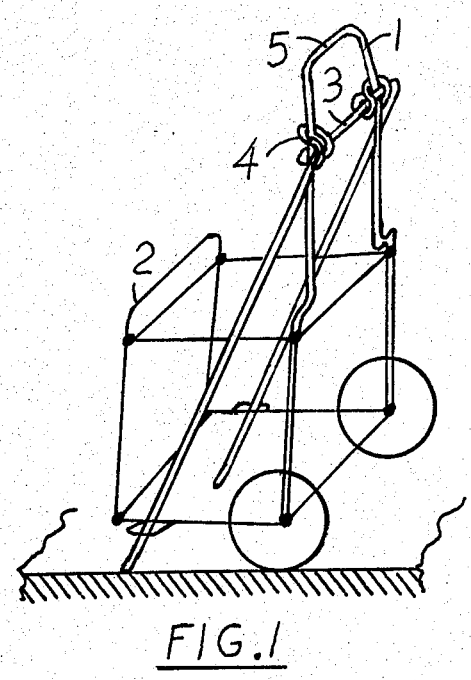
FIG. 1. A shopping cart where the traverse of its box is used like a handle for moving.
Figure 2:
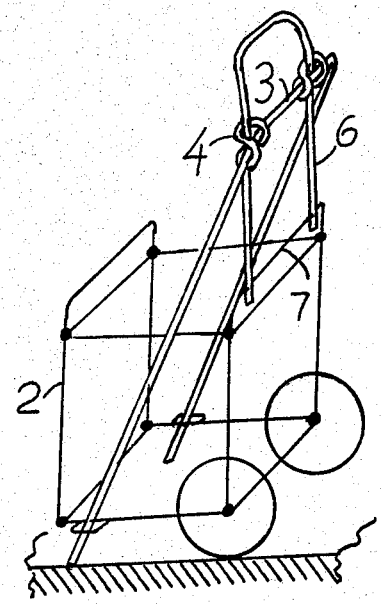
FIG. 2. A shopping cart with a supplementary handle which is connected with the box of the shopping cart.
Figure 3:
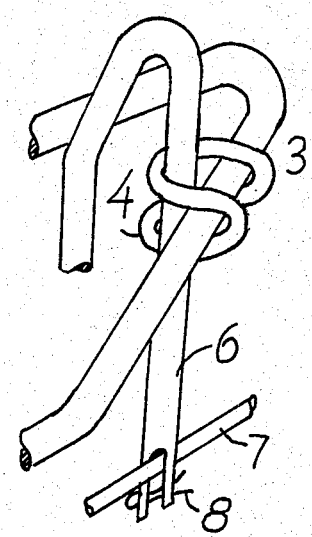
FIG. 3. A variation of connecting the supplementary handle with the leg-traverse of the shopping cart and with its box.
Figure 4:
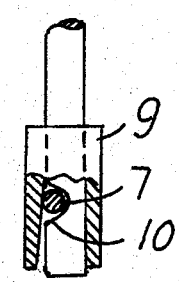
FIG. 4. A variation of connecting the supplementary handle with the box.
Figure 5:
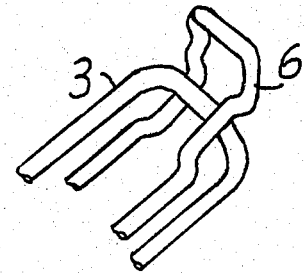
FIG. 5. A variation of connecting the handle with the shopping cart.
Figure 6:
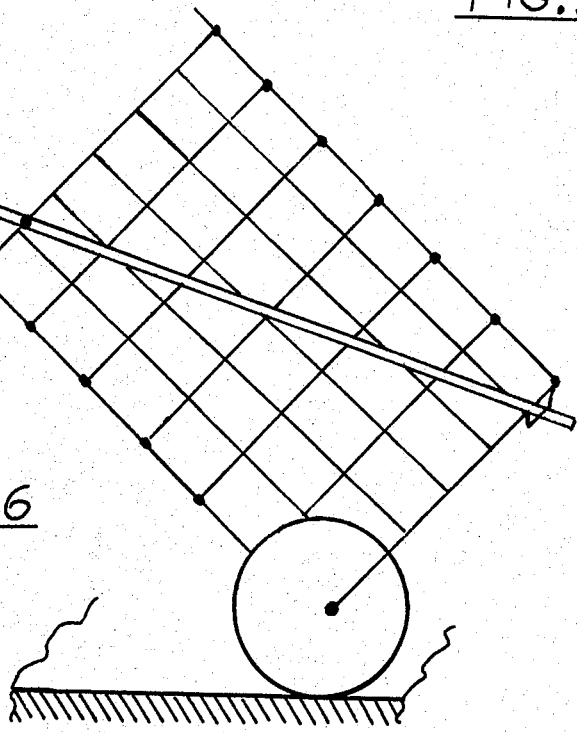
FIG. 6. The position of the shopping cart when it is moved.

The experimental testing of said shopping cart and of the standard shopping cart with said supplementary handle showed that they lighten the effective load two fold, keeps shopping cart wheels from scuffing user's heels, and allow shoppers to walk upright when pulling the cart.

I claim:

1. In a shopping cart comprising a collapsible box, having front and rear walls, wheels supporting said box at a rear lower edge, and a traverse comprised of a U shaped member, the legs of which are connected with the lateral sides of the box and run diagonally across those sides, and the part of the U shaped member joining the legs, extending above said rear wall, said box collapsing with movement of the front wall toward said rear wall with concomitant movement of the traverse to a position generally parallel to the rear wall, the improvement comprising, said rear wall including vertical, laterally spaced legs extending upwardly above the box and above said joining part of the traverse, means slidably interconnecting the joining part of the traverse and each vertical leg, the upper ends of the vertical legs being interconnected by a handle, whereby as the box is collapsed the joining part of the traverse slides upwardly along said vertical legs.

2. A shopping cart of claim 1, wherein said means slidably interconnecting comprise rings the lower ends of said vertical legs are connected with a rear, upper horizontally extending traverse of said rear wall as its extension and said rings are elliptically formed and so bent that they envelope the joining part of the shopping cart traverse.

3. A shopping cart of claim 2, wherein each lower end of the vertical legs is provided with a transversely extending slot for passing through it said upper traverse of the rear wall and for locking said upper traverse in this position by means of a plug, axially slidable on each vertical leg, said plug having an open slot which receives said traverse in said slot.

4. A shopping cart of claim 2, wherein said means for slidably interconnecting comprises shaped portions of said vertical legs, said legs are curved in such a manner, that one envelops the traverse of the shopping cart from one side and the second leg envelops said traverse from the opposite side, and the length of said curved parts of the legs corresponds to the distance of the movement of the joining part of the U shaped traverse.

* * * * *